J. RAMSBOTTOM.
LAMINATED FABRIC.
APPLICATION FILED SEPT. 3, 1918.

1,315,409.  Patented Sept. 9, 1919.

INVENTOR.
James Ramsbottom,
by
Bowden O'Brien
attys.

UNITED STATES PATENT OFFICE.

JAMES RAMSBOTTOM, OF HELMSHORE, ENGLAND.

LAMINATED FABRIC.

1,315,409. Specification of Letters Patent. Patented Sept. 9, 1919.

Application filed September 3, 1918. Serial No. 252,453.

*To all whom it may concern:*

Be it known that I, JAMES RAMSBOTTOM, a British subject, residing at Helmshore, Lancashire, England, have invented certain new and useful Improvements in Laminated Fabrics, of which the following is a specification.

This invention relates to laminæ fabrics which are formed by the laying together of various fibers.

Such fabrics have been formed by a layer or layers of carded wool and a layer or layers of woven fabric milled or fulled together and also by a layer or layers of carded wool and strips or bands of woven fabric.

I find that a better and stronger fabric is produced by laying together a narrow ribbon or sliver of loose carded or combed wool and a ribbon or band of spun unwoven yarn like warps or a ribbon or band of woven fabric in successive layers each overlapping the preceding one by winding them spirally over a roller or rollers so that the warp like threads will pass through the cloth from one face to the opposite face.

The invention will be fully described with reference to the accompanying drawings.

In carrying out the invention I take a lap or top A of carded wool—say from 6 to 9 inches wide—and a beam B of spun unwoven yarn-like warps or a band of loosely woven fabric of corresponding width to the top or lap A. The layer of carded sliver $a$ and the layer of spun yarn or woven fabric $b$ are together laid successively each overlapping the preceding one being wound spirally over a pair of rollers C D placed any desired distance apart to produce a continuous or endless fabric, the length of the rollers corresponding to the width of the fabric to be produced.

Figure 1:
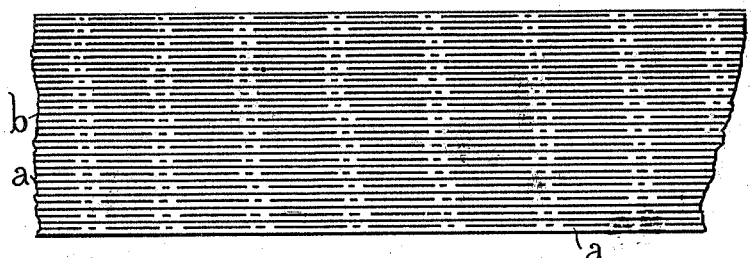
Figure 1 is a diagrammatic plan of ribbon or band of which the fabric may be built up.
Figure 2:
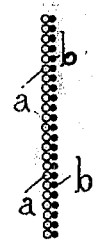
Fig. 2 is a section of same.
Figure 3:
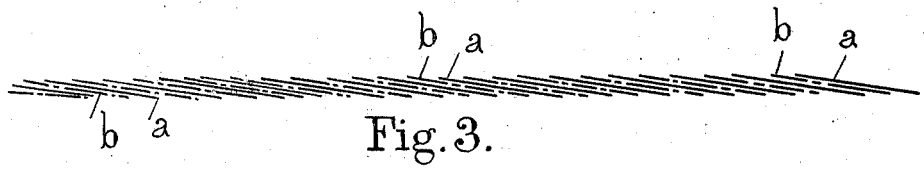
Fig. 3 is a diagrammatic section of the fabric.
Figure 4:
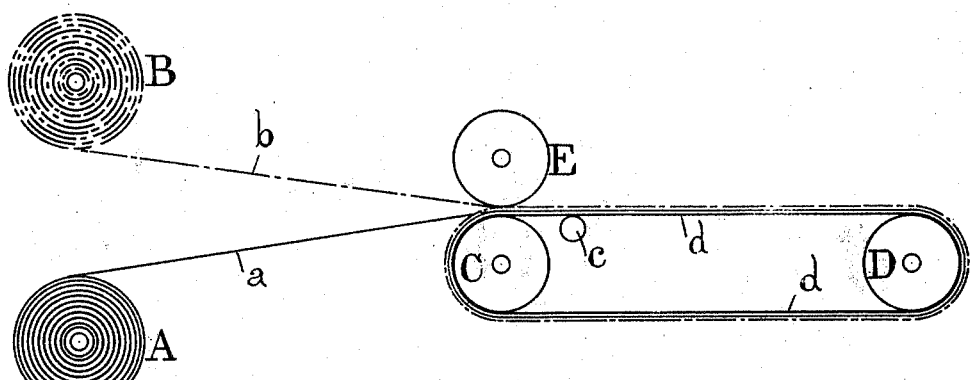
Fig. 4 is a diagram of rollers for winding the materials into a continuous or endless fabric.

To obtain the spiral formation of the endless or continuous cloth with narrow ribbons or bands $a$ and $b$ overlapping one another a slow traverse is given to them across the roller C, the two bands being traversed together. If desired the two layers $a$ and $b$ may be first made into a ribbon or band as in Figs. 1 and 2, and subsequently laid spirally over the rollers C D.

A pressure roller E is mounted above the first of the pair of rollers in loose bearings to permit it to adapt itself to the thickness and inclined surface of the fabric as the ribbons of fibers are wound thereon.

An endless band or apron $d$ may be stretched over the rollers C and D, to carry the material as it is being wound or built up, and this may be supported by a roller such as $c$.

Any other method of laying the two narrow layers of material $a$ and $b$ successively overlapping one another to form a continuous cloth may be adopted.

The edges of the fabric so formed may be folded over to form selvages.

The layers are held in position by a suitable size or adhesive material such as dextrine, applied as the layers are wound upon one another.

The fabric so formed will be endless or circular and to form a flat fabric will be severed transversely parallel to the longitudinal axes of the rollers, and to form a wide fabric two or more of such pieces may be overlapped and cemented together.

The fabric so formed may be employed as it leaves the forming machine or it may be milled or fulled into a homogeneous fabric and will then be suitable for such purposes as woven or felted cloths are now used.

What I claim as my invention and desire to protect by Letters Patent is:

A fabric formed or built up of alternate layers of loose carded or combed fibers, and spun unwoven yarn or woven fabric each layer narrower than the cloth and overlapping the preceding one substantially as described.

In testimony whereof I have hereunto set my hand in presence of two subscribing witnesses.

JAMES RAMSBOTTOM.

Witnesses:
J. OWDEN O'BRIEN,
GEO. H. O'BRIEN.

Copies of this patent may be obtained for five cents each, by addressing the "Commissioner of Patents, Washington, D. C."